(12) United States Patent
Kumar et al.

(10) Patent No.: US 11,579,936 B2
(45) Date of Patent: Feb. 14, 2023

(54) SYSTEM AND METHOD FOR CLOUD WORKLOAD PROVISIONING

(71) Applicant: HUAWEI TECHNOLOGIES CO., LTD., Guangdong (CN)

(72) Inventors: Krishna Mankili Kumar, Bangalore (IN); Shengjun Tang, Hangzhou (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 269 days.

(21) Appl. No.: 15/934,319

(22) Filed: Mar. 23, 2018

(65) Prior Publication Data

US 2018/0210763 A1  Jul. 26, 2018

Related U.S. Application Data

(63) Continuation of application No. PCT/CN2017/071191, filed on Jan. 14, 2017.

(30) Foreign Application Priority Data

Jan. 18, 2016 (IN) .............................. 201641001682

(51) Int. Cl.
*G06F 9/50* (2006.01)

(52) U.S. Cl.
CPC ............ *G06F 9/5072* (2013.01); *G06F 9/505* (2013.01); *G06F 9/5033* (2013.01); *G06F 9/5077* (2013.01)

(58) Field of Classification Search
CPC ...... G06F 9/5072; G06F 9/5033; G06F 9/505; G06F 9/5077; G06F 9/45558; H04L 67/10

(Continued)

(56) References Cited

U.S. PATENT DOCUMENTS

| | | | | |
|---|---|---|---|---|
| 5,408,663 | A | * | 4/1995 | Miller .................... G06Q 10/06 718/104 |
| 6,011,918 | A | * | 1/2000 | Cohen .................... G06F 9/465 719/330 |

(Continued)

FOREIGN PATENT DOCUMENTS

| | | |
|---|---|---|
| CN | 103858118 A | 6/2014 |
| CN | 104572294 A | 4/2015 |

(Continued)

OTHER PUBLICATIONS

Jingqi Yang et al., "Workload Predicting-Based Automatic Scaling in Service Clouds", 2013 IEEE Sixth International Conference on Cloud Computing, 2013, 6 pages.

(Continued)

*Primary Examiner* — Madhu Woolcock
(74) *Attorney, Agent, or Firm* — Womble Bond Dickinson (US) LLP

(57) ABSTRACT

Disclosed is a system and method for cloud workload provisioning. In one implementation, the present invention provides a system enabling an automated guidance to the user for the workload to be provisioned. The present invention matches the user's workload profile based on a wide variety of historical data set and makes easy for users to choose the cloud provisioning for various kinds of workloads. The system can automatically readjust a workload profile for cloud provisioning. The system can provide a manual selection option for cloud provisioning. In one embodiment, the present invention provides a system and method that derives a workload provision scaling factor mechanism using historic data set. Furthermore, the system and method can automatically or manually readjust the provision scaling factor based on a workload profile for cloud provisioning.

15 Claims, 8 Drawing Sheets

(58) Field of Classification Search
USPC .................................................... 709/226
See application file for complete search history.

(56) References Cited

U.S. PATENT DOCUMENTS

| | | | |
|---|---|---|---|
| 6,877,035 B2 | 4/2005 | Shahabuddin et al. | |
| 7,039,559 B2 | 5/2006 | Froehlich et al. | |
| 7,552,208 B2 | 6/2009 | Lubrecht et al. | |
| 7,644,148 B2 | 1/2010 | Ranganathan et al. | |
| 8,055,485 B2 | 11/2011 | Keller | |
| 8,104,041 B2* | 1/2012 | Belady | G06F 11/3409 |
| | | | 709/226 |
| 8,271,818 B2 | 9/2012 | Blanding | |
| 8,478,845 B2 | 7/2013 | Agarwala et al. | |
| 9,009,294 B2 | 4/2015 | Dawson et al. | |
| 9,015,708 B2 | 4/2015 | Choudhury et al. | |
| 9,979,617 B1* | 5/2018 | Meyer | H04L 43/0817 |
| 10,049,335 B1* | 8/2018 | Narkier | G06Q 10/0637 |
| 10,402,733 B1* | 9/2019 | Li | G06N 5/04 |
| 2003/0231593 A1* | 12/2003 | Bauman | H04L 47/6215 |
| | | | 370/235 |
| 2004/0186907 A1* | 9/2004 | Wentink | H04W 74/085 |
| | | | 709/225 |
| 2005/0125213 A1 | 6/2005 | Chen et al. | |
| 2005/0210469 A1 | 9/2005 | Chung et al. | |
| 2007/0250837 A1* | 10/2007 | Herington | G06F 9/50 |
| | | | 718/105 |
| 2008/0022284 A1* | 1/2008 | Cherkasova | G06F 9/4881 |
| | | | 718/104 |
| 2008/0172673 A1* | 7/2008 | Naik | G06F 9/5083 |
| | | | 718/104 |
| 2009/0070771 A1* | 3/2009 | Yuyitung | G06Q 10/06 |
| | | | 713/323 |
| 2010/0223385 A1* | 9/2010 | Gulley | G06F 9/5027 |
| | | | 709/226 |
| 2010/0269109 A1* | 10/2010 | Cartales | G06F 9/5072 |
| | | | 718/1 |
| 2010/0323622 A1* | 12/2010 | Nentwig | H04J 11/004 |
| | | | 455/63.1 |
| 2011/0022812 A1* | 1/2011 | van der Linden | G06F 9/5077 |
| | | | 711/163 |
| 2011/0131589 A1* | 6/2011 | Beaty | G06F 9/5077 |
| | | | 719/318 |
| 2011/0145392 A1 | 6/2011 | Dawson et al. | |
| 2011/0154321 A1* | 6/2011 | Tian | G06F 1/3203 |
| | | | 718/1 |
| 2011/0179162 A1 | 7/2011 | Mayo et al. | |
| 2012/0079500 A1* | 3/2012 | Floyd | G06Q 30/06 |
| | | | 718/105 |
| 2012/0144038 A1* | 6/2012 | Hildebrand | H04L 41/0806 |
| | | | 709/224 |
| 2012/0198073 A1* | 8/2012 | Srikanth | H04L 67/10 |
| | | | 709/226 |
| 2012/0203820 A1 | 8/2012 | Burckart et al. | |
| 2012/0239739 A1* | 9/2012 | Manglik | G06F 9/5077 |
| | | | 709/203 |
| 2012/0254443 A1 | 10/2012 | Ueda | |
| 2012/0265881 A1* | 10/2012 | Chen | H04L 12/12 |
| | | | 709/226 |
| 2013/0042004 A1 | 2/2013 | Boss et al. | |
| 2013/0042123 A1* | 2/2013 | Smith | G06F 9/5077 |
| | | | 713/300 |
| 2013/0086273 A1 | 4/2013 | Wray et al. | |
| 2013/0138806 A1* | 5/2013 | Gohad | G06F 9/5072 |
| | | | 709/224 |
| 2013/0174149 A1* | 7/2013 | Dasgupta | G06F 9/5077 |
| | | | 718/1 |
| 2013/0185433 A1* | 7/2013 | Zhu | H04L 43/0882 |
| | | | 709/226 |
| 2013/0185729 A1* | 7/2013 | Vasic | G06F 9/5072 |
| | | | 718/104 |
| 2013/0227584 A1* | 8/2013 | Greene | G06F 9/5083 |
| | | | 718/104 |
| 2013/0290538 A1* | 10/2013 | Gmach | G06F 11/3457 |
| | | | 709/226 |
| 2013/0304925 A1* | 11/2013 | Ferris | G06F 9/5072 |
| | | | 709/226 |
| 2013/0346772 A1* | 12/2013 | Abou Gazala | G06F 1/3262 |
| | | | 713/320 |
| 2014/0019966 A1* | 1/2014 | Neuse | G06F 9/45533 |
| | | | 718/1 |
| 2014/0195683 A1* | 7/2014 | Ammerman, III | H04L 41/147 |
| | | | 709/226 |
| 2015/0067171 A1* | 3/2015 | Yum | G06F 9/5072 |
| | | | 709/226 |
| 2015/0074679 A1 | 3/2015 | Fenoglio et al. | |
| 2015/0113120 A1 | 4/2015 | Jacobson et al. | |
| 2015/0281113 A1* | 10/2015 | Siciliano | G06F 9/505 |
| | | | 709/226 |
| 2015/0288571 A1 | 10/2015 | Baughman et al. | |
| 2015/0301869 A1* | 10/2015 | Chan | G06F 9/5088 |
| | | | 718/105 |
| 2015/0317189 A1 | 11/2015 | Georgescu et al. | |
| 2016/0094483 A1* | 3/2016 | Johnston | H04L 47/827 |
| | | | 709/226 |
| 2016/0117180 A1* | 4/2016 | Cardonha | G06F 11/3024 |
| | | | 713/100 |
| 2016/0119246 A1* | 4/2016 | Wang | G06F 9/546 |
| | | | 709/226 |
| 2016/0255159 A1* | 9/2016 | Beasley | G06F 11/00 |
| | | | 709/226 |
| 2017/0024257 A1* | 1/2017 | Cropper | G06F 9/505 |
| 2017/0075728 A1* | 3/2017 | Cropper | G06F 9/5083 |
| 2017/0104627 A1* | 4/2017 | Bender | H04L 47/765 |
| 2017/0168729 A1* | 6/2017 | Faulkner | G06F 3/0631 |
| 2017/0185456 A1* | 6/2017 | Bramary | G06Q 10/06 |
| 2017/0300359 A1* | 10/2017 | Kollur | G06F 9/4881 |
| 2018/0046477 A1* | 2/2018 | Aelken | G06F 9/45529 |
| 2018/0173556 A1 | 6/2018 | Ghosh et al. | |

FOREIGN PATENT DOCUMENTS

| | | |
|---|---|---|
| EP | 2615803 A2 | 3/2017 |
| WO | 2012087104 A1 | 6/2012 |

OTHER PUBLICATIONS

Arijit Khan et al.,"Workload Characterization and Prediction in the Cloud:A Multiple Time Series Approach", Network Operations and Management Symposium, 2012, 8 pages.
Allen B. Downey et al.,"The Elusive Goal of Workload Characterization",Acm Sigmetrics Performance Evaluation Review,1999,16 pages.
Nilabja Roy et al.,"Efficient Auto scaling in the Cloud using Predictive Models for Workload Forecasting",IEEE International Conference on Cloud Computing, 2011, 8 pages.
Daniel Gmach et al.,"Workload Analysis and Demand Prediction of Enterprise Data Center Applications", Sep. 1, 2011,10 pages.
V.Sivaranjani et al.,"Optimization of workload prediction based on map reduce frame work in a cloud system", Journal of Research in Engineering and Technology, Mar. 2014, 3 pages.
Warren Smith et al.,"Predicting application run times using Historical Information", May 25, 2006, 22 pages.
Malte Schwarzkopf et al.,"Omega: flexible, scalable schedulers for large compute clusters", Google, Inc., Apr. 15-17, 2013, 14 pages.

* cited by examiner

| Job | Load (user) | Capacity (key value) | Resources | | Scaling factor | Comments |
|---|---|---|---|---|---|---|
| | | | CPU | MEM | | |
| | All values in percentage (%) | | | | Numerical Number | |
| 1 | 200 | 200 | 50 | 30 | 5 | Over provisioned |
| 2 | 100 | 150 | 60 | 80 | 3.5 | |
| 3 | 100 | 100 | 90 | 90 | 1.11 | A good working system |
| 4 | 100 | 100 | 100 | 100 | 1 | Profile just enough system |
| 5 | 100 | 99 | 100 | 100 | 0.98 | |
| 6 | 80 | 80 | 99 | 95 | 0.82 | |
| 7 | 50 | 90 | 90 | 90 | 0.77 | |
| 8 | 50 | 40 | 80 | 80 | 0.56 | |
| 9 | 30 | 50 | 80 | 80 | 0.5 | |
| 10 | 10 | 10 | 100 | 100 | 0.1 | Really bad or inadequate system |

*Comments are very generic and you need to infer and adjust resource allocation in your setup; scaling factor is a guidance.

FIGURE 3

SYSTEM AND METHOD FOR CLOUD WORKLOAD PROVISIONING

CROSS-REFERENCE TO RELATED APPLICATIONS

The application is a continuation of International Application No. PCT/CN2017/071191, filed on Jan. 14, 2017, which claims priority to India Patent Application No. IN201641001682, filed on Jan. 18, 2016, The disclosures of the aforementioned applications are hereby incorporated by reference in their entireties.

TECHNICAL FIELD

The present invention relates to resource provisioning in a networked computing environment (e.g., a cloud computing environment), and more particularly, to a system and method for resource provisioning using a historic data based approach.

BACKGROUND

The networked computing environment (e.g. Cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, storage devices, among others.

Cloud computing services are typically rendered within a relatively static hardware pool whereby operating systems and applications are deployed and reconfigured to meet the computational demands of consumers. Within the cloud environment's boundaries, application images can be installed and overwritten, Internet Protocol (IP) addresses may be modified and real and virtual processors may be allocated to meet changing business needs. Presently, different cloud service providers may take varying amounts of time to provision computing resources workload requested by consumers. For example, some cloud providers may provision a particular resource in a matter of seconds, while others may take hours.

Further, the cloud workload provisioning is done by various vendors in different ways. In most of the cases a pre-defined template is selected and application is deployed to it. However, the real resource usage of the application may not be known at initial stage or beginning and so resources are arbitrarily allocated. This is a major concern that sometime over provisioning of the resource(s) causes wastage, and other cases under provision may cause system performance deteriorate a lot (even loss of application state). Also, the prediction models of provisioning used for instant workload adjustments, analyzing various parameters and incorporating all those into a decision making process for provisioning is done in various methods by the prior-arts. However, the existing methods are complex and involve too many parameters to understand so as to decide the correct cloud provisioning which makes resource selection very poor and inefficient.

SUMMARY

This summary is provided to introduce concepts related to system and method for cloud workload provisioning, and the same are further described below in the detailed description. This summary is not intended to identify essential features of the claimed subject matter nor is it intended for use in determining or limiting the scope of the claimed subject matter.

An embodiment of the present invention is to solve the technical problem as recited above by providing a system and method for workload provisioning using a historic data based approach.

Another embodiment of the present invention is to provide a system and method for cloud workload provisioning using a scaling factor derived from a historic data based approach.

Another embodiment of the present invention is to provide a system and method that provide an automated guidance to assist the users for resource selection.

Another embodiment of the present invention is to provide a system and method that use a historic workload profile, classify the applications based on the workload profile and derive an optimum method to identify the resources to achieve cloud provisioning.

Another embodiment of the present invention is to provide a system and method with an interface that enables a user to select manual or automatic adjustment of the resources so that desired or optimal conditions are met as needed.

Another embodiment of the present invention is to provide a system and method to derive a workload provision scaling factor mechanism by using historic data set.

Another embodiment of the present invention is to provide a system and method based on the provision scaling factor to automatically or manually readjust the workload profile for cloud provisioning.

Another embodiment of the present invention is to provide a system and method for selecting the provisioning mechanism.

Another embodiment of the present invention is to provide a system and method for notifying the resource provisioned and the charge/fee based on the resource provisioned.

According to one embodiment, a system and method derive a workload provision scaling factor mechanism using historic data set. The system and method automatically or manually readjust the provision scaling factor based on the workload profile for cloud provisioning.

In one embodiment, a method for cloud workload provisioning is disclosed. The method includes: receiving at least a cloud workload provision request; deriving, using at least one workload profile of a historic data set, a workload provision scaling factor for the received cloud workload provision request; and readjusting, automatically or manually, the workload provision scaling factor for cloud workload provisioning.

In one embodiment, a method for cloud workload provisioning is disclosed. The method includes: receiving at least a cloud workload provision request, in a computer data structure of the networked computing environment, for the cloud workload provisioning; identifying at least one parameter associated with the received cloud workload provision request; deriving a workload provision scaling factor for the received cloud workload provision request based on the identified parameter and at least a pre-stored workload profile; and provisioning the cloud workload based on the determined scaling factor.

In one embodiment, a system for cloud workload provisioning in a networked computing environment is disclosed. The system includes a processor, and a memory coupled to the processor for executing a plurality of modules present in the memory. The plurality of modules includes a receiving module, an engine, a readjustment module, and a workload provisioning module. The receiving module is configured to receive at least a cloud workload provision request. The engine is configured to derive a workload provision scaling factor for the received cloud workload provision request using at least one workload profile of a historic data set. The readjustment module is configured to readjust, automatically or manually, the workload provision scaling factor. The workload provisioning module is configured to provision the cloud workload based on the readjusted workload provision scaling factor.

In one embodiment, a system for cloud workload provisioning in a networked computing environment is disclosed. The system includes a processor, and a memory coupled to the processor for executing a plurality of modules present in the memory. The plurality of modules includes a receiving module, an identification module, an engine, and a workload provisioning module. The receiving module is configured to receive at least a cloud workload provision request, in a computer data structure of the networked computing environment, for the cloud workload provisioning. The identification module is configured to identify at least one parameter associated with the received cloud workload provision request. The engine is configured to derive a workload provision scaling factor for the received cloud workload provision request based on the identified parameter and at least a pre-stored workload profile. The workload provisioning module is configured to provision the cloud workload based on the determined scaling factor.

In one embodiment, a method for cloud workload provisioning is disclosed. The method includes: receiving at least a cloud workload profile provision request; comparing the received cloud workload profile provision request with a plurality of historical workload profiles; deriving, using the historical workload profile, a workload provision scaling factor for the received cloud workload profile provision request; readjusting, automatically or manually, the workload provision scaling factor for the cloud workload profile provision request; and provisioning the cloud workload based on the workload provision scaling factor.

In one embodiment, a system for cloud workload provisioning for allocating workload among cloud based environment based upon historical data is disclosed. The system includes a database containing a repository of the historical data in a historical data table of historical workload profiles. The system includes an engine configured to search the repository of the historical data to select at least a historical workload profile based on a received cloud workload profile provision request. The engine is configured to derive, using the historical workload profile, a workload provision scaling factor for the cloud workload profile provision request received. The engine is configured to readjust, automatically or manually, the workload provision scaling factor for the cloud workload profile provision request and to provision the cloud workload based on the workload provision scaling factor.

In contrast to prior-art techniques, an embodiment of the present invention derives a workload provision scaling factor using historic data set and based on the provision scaling factor, automatically or manually, readjusts the workload profile for cloud provisioning.

Embodiments of the present invention, as compared to prior-art techniques which involves too many parameters to understand the correct cloud provisioning which can result in poor user resource selections, can provide an automated guidance to assist workload provisioning. Further, as compared to the prior-art techniques, embodiments of the present invention can provide a mechanism that enables the user to understand how a provision happens in a system and also helps the user to make an informed decision on how to provision a workload. Embodiments of the present invention can provide a mechanism to improve the provisioning, as all current provision are more of prediction models used for instant workload adjustments, by using the historic workload profile, classify the applications based on the historic workload profile, and derive some optimum methods to identify the system resources for cloud provisioning. Furthermore, as compared to the prior-art techniques, embodiments of the present invention can provide an interface for manual or automatic adjustment as users choose and can modify the workload provisioning based on a system recommended value. This helps the usability of the system very much and cut resource wastage.

The various options and preferred embodiments referred to above in relation to one embodiment are also applicable in relation to other embodiments.

BRIEF DESCRIPTION OF THE ACCOMPANYING DRAWINGS

The detailed description is described with reference to the accompanying figures. In the figures, the left-most digit(s) of a reference number for features and components identifies the figure in which the reference number first appears. The same reference numbers are used throughout the drawings to refer to like features and components.

FIG. 3 illustrates a scaling factor—sample estimation, in accordance with an embodiment of the present subject matter.

Figure 1:
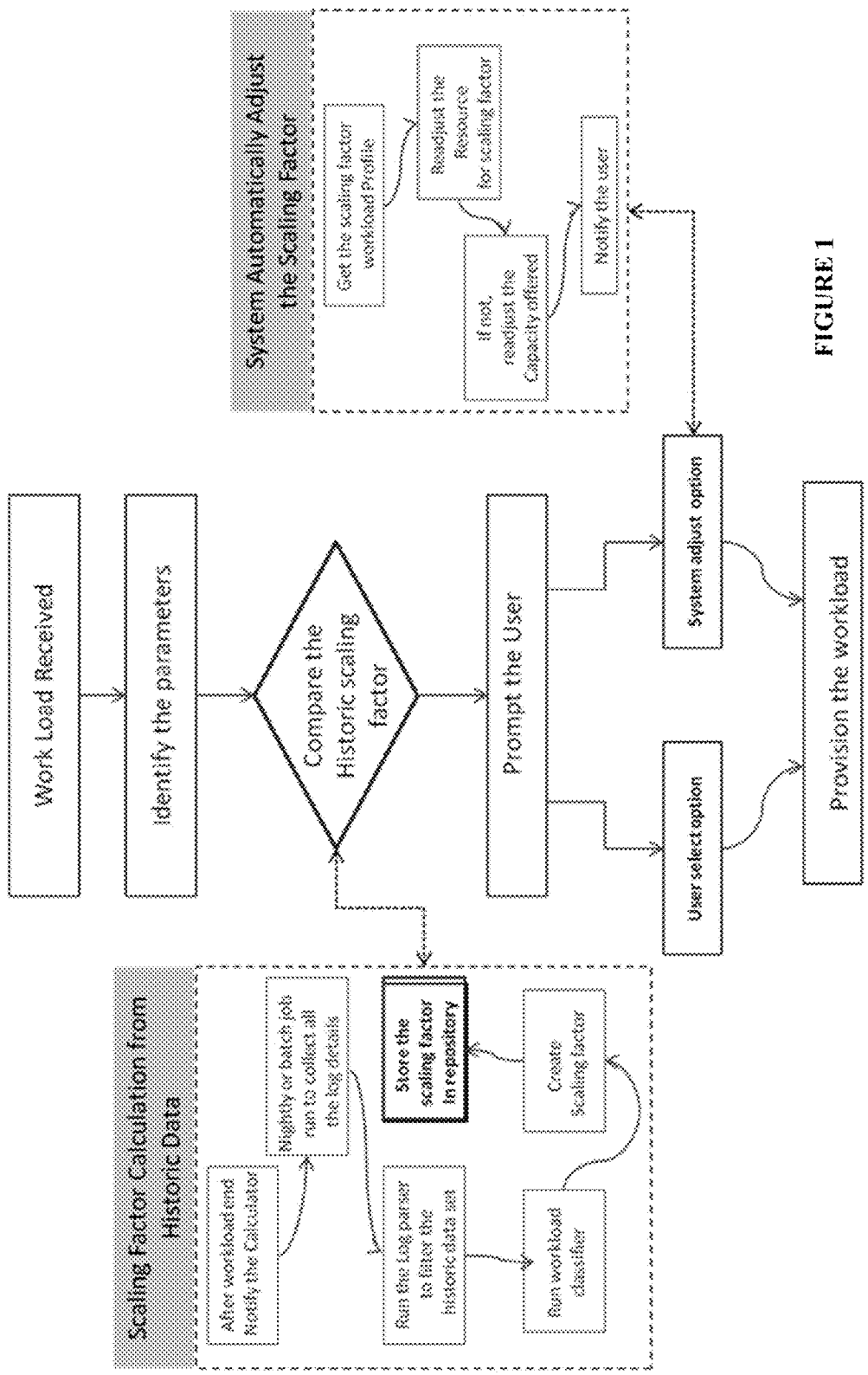
FIG. 1 illustrates a work flow of the cloud workload provision using a scaling factor, in accordance with an embodiment of the present subject matter.

It is to be understood that the attached drawings are for purposes of illustrating the concepts of embodiments of the invention and may not be to scale.

DETAILED DESCRIPTION OF THE PRESENT INVENTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

In general, embodiments of the present invention provide system and method for cloud workload provisioning. In one embodiment, a system and method include a mechanism to derive a workload provision scaling factor using historic data set is disclosed. In one embodiment, the system and method automatically or manually readjust the provision scaling factor based on a workload profile for cloud provisioning.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a service delivery model enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating system, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Systems and methods for cloud workload provisioning are disclosed.

While aspects are described for system and method for cloud workload provisioning, embodiments of the present invention may be implemented in any number of different computing systems, environments, and/or configurations, the embodiments are described in the context of the following exemplary systems, apparatus, and methods.

In one embodiment, a system and method to provision the work load in a cloud is provided. The system derives a workload provision scaling factor mechanism by using historic data set. Based on the derived provision scaling factor, the workload profile for cloud provisioning is adjusted automatically or manually. The system provides an interface for a user to select manual or automatic adjustments of resources so that desired or optimal conditions are met. The system can also notify an amount of provisioned resource to the user and charge/fee based on the provisioned resource.

In one embodiment, once a customer load is received by the cloud providers, a system and method checks for an appropriate profile based on a parameter. In one embodiment, the parameter is a scaling factor. The scaling factor can be calculated by identifying the prominent characteristics (parameters received) of the workload like required user input capacity and expected output capacity. For each completed workload, a historic data table approach is used to calculate the scaling factor. The information is then stored in the persistence storage. In one embodiment, once a profile is selected, a system and method provides options to a user to choose appropriate resources. The options may include a manual adjustment to the scaling factor or an automatic adjustment for the scaling factor. Using the manual option, the user may select a scaling factor value or suggest a new value to provision workload. Using the automatic option, the system readjusts the resources based on a scaling factor provided by the system for the current workload. In one embodiment, once the options are selected, a system and method applies the profile and provisions the workload. In one embodiment, upon provisioning the workload, the system and method displays the selected resources or allocations for the workload. Furthermore, the system and method may provide the cost involved for the workload provisioning based on the standard provider model.

Referring now to FIG. 1, a work flow of the cloud workload provision using a scaling factor is illustrated in accordance with an embodiment of the present subject matter. As shown in FIG. 1, the cloud providers or the cloud portal receives a workload. The workload may provide the minimum customer required parameters like input or output. For example, the input may be 'number of customers' and the output may be 'number of transactions per second'. These parameters can be collected from a portal of a provider interface. Upon receipt of the workload, a decision making engine according to some embodiments compares these parameters with an already available set of workload profiles which is described in the proceeding section by using a mechanism called 'scaling factor'.

Once the relevant or appropriate scaling factor is selected for the workload profile depending on the parameters provided, this information is prompted to the customer for further action. The user may be prompted with two options to select from, one to manually adjust the scaling factor, or another to automatically execute the selected scaling factor.

In one embodiment, when the customer selects the manual option, a system enables the user to readjust the scaling factor by further enabling the user to select the required resources by the user, upon the selection, the system executes a workload profile and cloud provisioning is achieved.

In one embodiment, if the customer selects the automatic option, referring to the right hand side of FIG. 1, the system selects a scaling factor and readjusts the workload resource. First, the system collects a scaling factor calculated from a workflow referring to the right hand side of FIG. 1 "Scaling factor calculation from historic data". Second, the system may readjust the resources as needed for the scaling factor. Each scaling factor setting is associated with a set of resource requirements which can be applied to the available resource pool. Third, the system may readjust a capacity (user input, user output, or load) to the maximum if not all of the scaling factor requirements are met. Finally, the system may notify the user of the about changes to the system. For example, as shown in the table "Scaling factor—Sample Estimation" of FIG. 3, if a calculated scaling factor is 3.5, the system may be over provisioned. Since the workload requires only CPU 60% and memory 80% of the allocated resources, the resources may be reduced. In one embodiment, the system includes a readjustment option that is configured to reduce the CPU requirements and the memory requirements of the allocated resource in a standard manner as in Virtual machine (VM) or in Containers. A known processing hereinafter may be understood by the person skilled in the art and hence is not explained in this document to avoid complexities.

In one embodiment, a system automatically readjusts a scaling factor based on the needs and requirements of a workload received, and upon the readjustment, the system executes a workload profile to achieve cloud provisioning.

Upon executing a workload profile to achieve cloud provisioning, the system notifies a user about the actions taken in a reporting mechanism.

Scaling Factor Creation Process: The scaling factor calculation according to an embodiment of the present invention is based on a historic data set. According to an embodiment of the present invention, when any workload end (or complete), a calculator is notified. The calculator is configured to perform a batch job on the completed workload to collect all the relevant log details from the workload. Furthermore, the calculator can use a log parser to extract relevant information from the historic data set. Upon extraction of the relevant information, a workload classifier can categorize the workload in appropriate categories that may include but not limited to, small tasks, long running tasks, etc. Based on the extracted information, the calculator generates a scaling factor. Upon generation of the scaling factor, the scaling factor generated can be stored in a repository 420. In one embodiment, along with each scaling factor all the information associated with the scaling factor such as resource profile (workload profile) may also be stored in the repository 420. The workload profile may be used to compare the workload received from the user and to provision the workload when corresponding scaling factor is selected/matched. In one embodiment, the workloads may be of the same nature to classify the workload to different bucket. In one embodiment, workload can belong to different workload categories and a scaling factor may be calculated for each category.

An example for scaling factor, scaling factor calculation, and their associated details is provided below. It may be understood by the person skilled in the art that, the example is provided for mere understanding purpose and shall not restrict the protection scope of the present invention in any manner.

In Step 1: At least the following prominent parameters are identified and captured for a workload

| Parameters | Examples | Requirements |
|---|---|---|
| Resources | CPU, memory, etc | CPU 80% |
| Load | customer/input | 1000 customers |
| Capacity | Output tps, rps, httpConn, etc | 100 tps |

In step 2: Once a workload run is over, a data set is extracted from the log file and is processed for scaling factor calculations. After that, the data set can be stored in a historic database (DB) table along with a resource profile. A scaling factor estimation based on historic set can then be performed. In one embodiment of the present invention, a scaling factor is a formula derived using some key parameters of the workload.
For example, $$\text{Scaling Factor} = \frac{1}{2}(\text{LoadAvg \%} + \text{CapacityAvg \%})/(\text{ResourcesAvg \%}),$$

where,
LoadAvg % is the input load expected during the time of the run of the workload, which is averaged out for the duration and the percentage of that value;
CapacityAvg % is the output load expected during the time of the run of the workload, which is averaged out for the duration and the percentage of that value;
ResourceAvg % is the resource load, which may be used during the time of the run of the workload, which is averaged out for the duration and the percentage of that value. For one example, Scaling Factor=½(80+80)/(Avg (99+95)=0.82.
Here, User load is 80% of expected, and Capacity like TPS is also 80% of expected. CPU used is 99% and memory used is 95%. In this case, the present system does not meet the need for the user, so if a workload of this profile is schedule, a better resource should be allocated to it.
In step 3: When a new workload is received from the user, the inputs may provide either input or output parameters or both. In one embodiment, on receipt of the input, the system looks for appropriate or more relevant profile from the historic table and selects an associated scaling factor from the more relevant profile.
In one embodiment, scaling factor=1 indicates a historic work load profile containing resources for execution of the received workload is fit for that workload to run. A scaling factor <1 indicates fewer resources are allocated to the workload received, and a scaling factor >1 indicates more resources are allocated to the workload.
In one embodiment, the key parameters (data points) of the workload may be decided based on an average data set for all the needed parameters captured. In one embodiment, all data points are stored in percentage. The data set can be captured from the stored logs. If the stored logs are not adequate, respective parameters can be added to be captured.
In one embodiment, the resources that may be considered in accordance with an embodiment of the present invention may be ResourcesAvg %:
CPUAvg=Average CPU usage during the duration of the run—in percentage.
MEMAvg=Average Memory usage during the duration of the run—in percentage.
In one embodiment, the input load may be: LoadAvg %: the number of users accommodated by the system vs. number of users expected to be run—in percentage. If there is more than one value, depends upon the significant an average of the value may be considered.
In one embodiment, the output capacity may be Output Capacity: CapacityAvg %: Key parameter value served vs. key parameter expected to serve—in percentage. If more than one value, depends upon the significant an average of the value may be considered.
In one embodiment, resources can be classified. Further, a refinement of the classification is possible with additional resources like disk, network, etc.
In one embodiment, the scaling factor may be dependent on other parameters apart from the few mentioned above. For each of these other parameters, additional data point can be added to further classify the workload. Different workload may have different characteristics and resource requirements. In one embodiment, workload can be classified into three categories and application can be profiled into categories, such as:
Affinity: Must have Affinity, Better to have Affinity, No Affinity
Load Duration: Sec, hrs, weeks
Type of job: Batch, LRP, Never-Ending, Burst job/Quiet period
In one embodiment, the applications can be further classified based on the type of software stack involved such as java, ruby, go, or QoS, etc.
Another example showing the scaling factor calculation is provided below:
If users are input and key value is output, then, $$\text{Scaling Factor} = \frac{1}{2}(\text{UserAvg \%} + \text{KeyvalueAvg \%})/(\text{Avg}(\text{CPUAvg \%} + \text{MEMAvg \%})),$$

Figure 2:
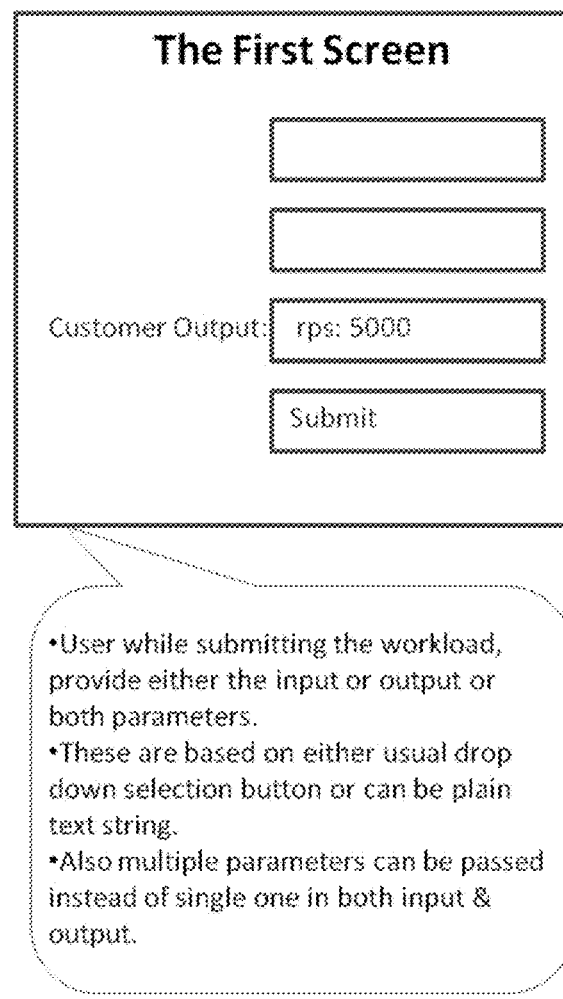
FIG. 2(a) illustrates an interface showing when a customer workload is provided to the cloud portal, in accordance with an embodiment of the present subject matter.
FIG. 2(b) illustrates an interface showing a display that suggests a scaling factor for the profile of the customer workload, in accordance with an embodiment of the present subject matter.
FIG. 2(c) illustrates an interface showing a notification once the workload is provisioned, in accordance with an embodiment of the present subject matter.
Figure 2:
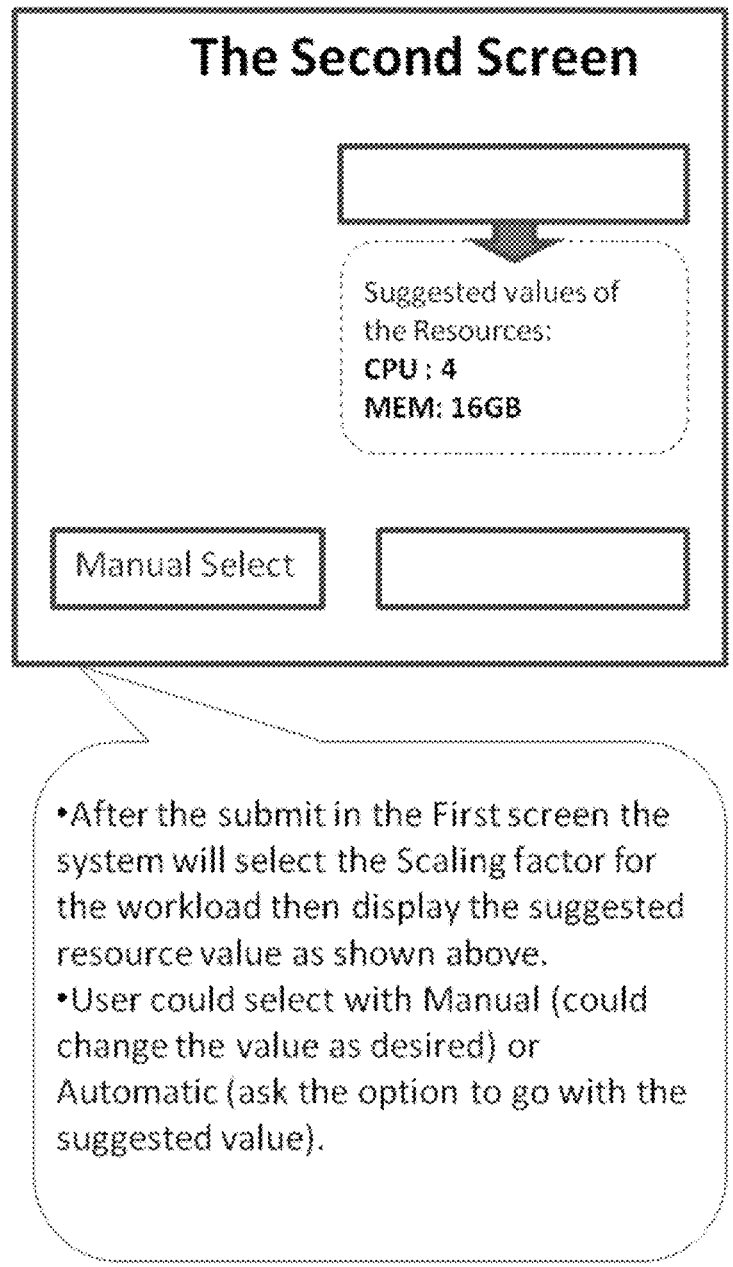
Figure 2:
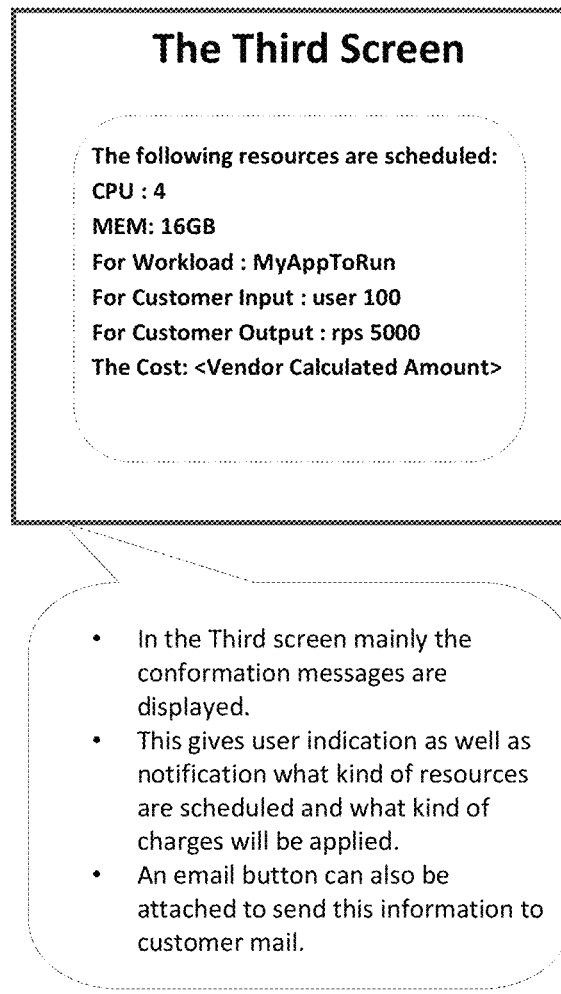

Hence, the Scaling Factor=½(80+80)/(Avg(99+95)=0.82.
As seen in the above example, the user load is 80% of expected and the capacity like TPS is also 80% expected. According to the present invention, this system does not meeting the need for the user. So if a workload is scheduled for this profile, better resource should be allocated to it.
Referring now to FIG. 2(a), an interface showing when a customer workload is provided to the cloud portal is illustrated, in accordance with an embodiment of the present subject matter. In one embodiment, as shown in FIG. 2(a), when a customer workload is provided to a cloud portal, a customer is given an option to enter an input and an output capacity of a desired application. The user may enter an appropriate value and submit the workload. The user is provided with an option to select values from a drop down menu on the interface. The user is further provided with the flexibility to provide more than one inputs.
Referring now to FIG. 2(b), an interface showing a display that suggests a scaling factor for the profile of the customer workload is illustrated, in accordance with an embodiment of the present subject matter. In one embodiment, as shown in FIG. 2(b), the interface displays a suggested scaling factor for a profile. Along with the display of the scaling factor, the interface can show an appropriate profile to the user. This gives a very good indication of what kind of a system is going to be provisioned. Further, as shown in the FIG. 2(b), the interface enables the user to select the options to manually adjust a profile or allow the system to adjust the profile automatically. As shown in FIG. 2(b), if option for manual adjustment is selected, the user can edit the scaling factor shown in the interface, to which the user may choose to maintain the same number or a different number. This feature of choice provides a tremendous flexibility. If the user chooses an automatic option for adjustment, then the system is configured to select the profile based on the scaling factor displayed and provision the workload.

Referring now to FIG. 2(c), an interface showing a notification once the workload is provisioned is illustrated, in accordance with an embodiment of the present subject matter. In one embodiment, as shown in the FIG. 2(c), once the workload is provisioned, the user is notified with the successful provisioning of the workload. The interface as shown in FIG. 2(c) may conclude the process flow and the successful provisioning of the cloud resources as appropriate for the customer. In one embodiment, after the provisioning, a message may be displayed on the interface or any indication notifying the provisioned resources along with the charges may be displayed. In one notifying, an email button may be provided on the interface which enables the provisioned resources to be mailed to the user.

Referring now to FIG. 3, a scaling factor—sample estimation is illustrated in accordance with an embodiment of the present subject matter. As shown in the FIG. 3, a scaling factor based on key parameters is provided for an input workload and historic data set. As shown in the FIG. 3, the workload received from the user includes capacity, and resources as parameters are used to compare with the historic data set and a relevant scaling factor. Once the scaling factor is provided, the user has the flexibility to readjust the scaling factor and thereby provision the workload as per the requirement.

Figure 4:
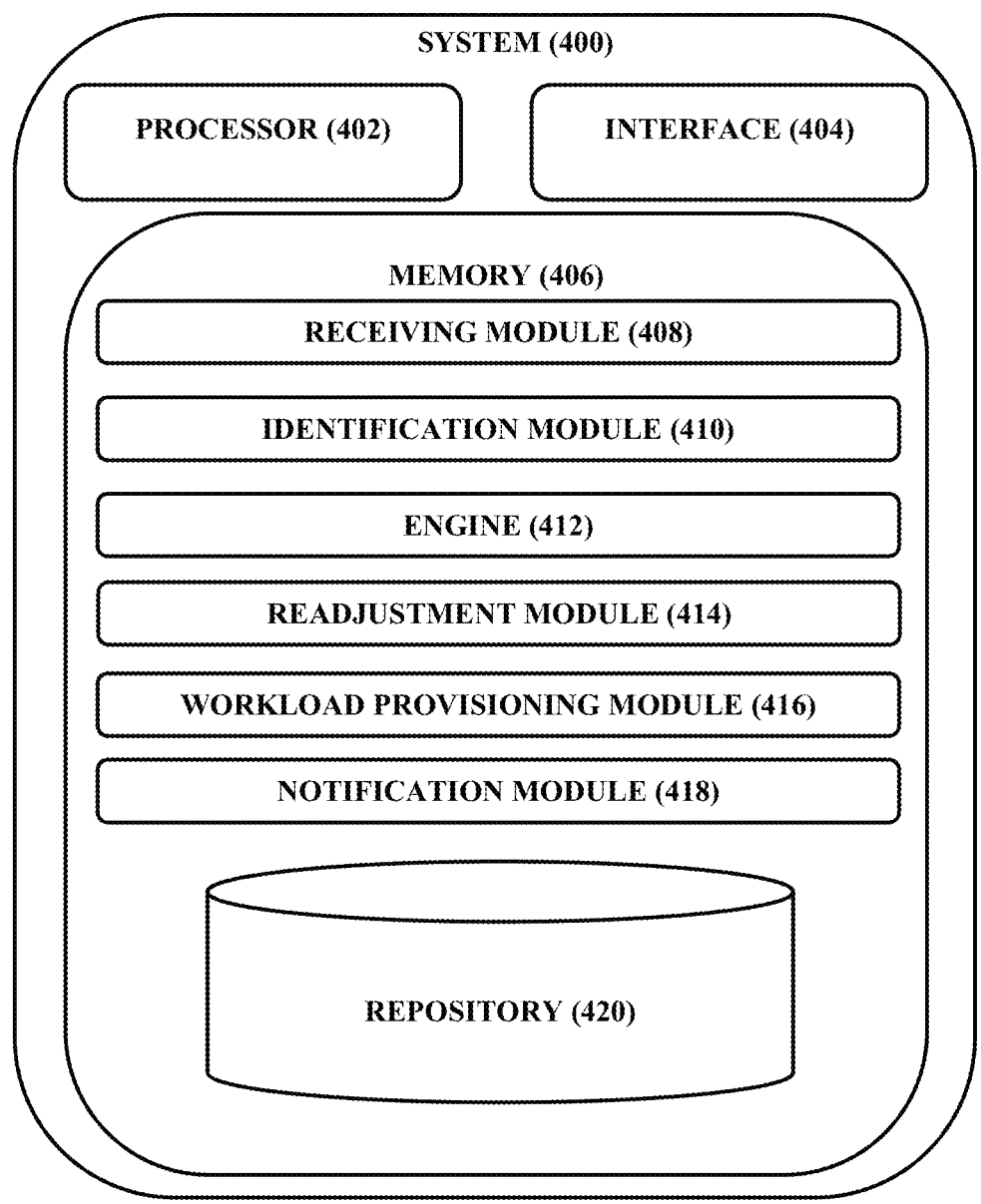
FIG. 4 illustrates a system for cloud workload provisioning, in accordance with an embodiment of the present subject matter.

Referring now to FIG. 4, a system for cloud workload provisioning is illustrated, in accordance with an embodiment of the present subject matter. The system 400 may also be implemented in a variety of computing systems, such as a laptop computer, a desktop computer, a notebook, a workstation, a mainframe computer, a server, a network server, and the like. It will be understood that the system 400 may be accessed by multiple users, or applications residing on the system 400. Examples of the system 400 may include, but are not limited to, a portable computer (computer system), a personal digital assistant, a handheld device, sensors, routers, gateways and a workstation. The system 400 is communicatively coupled to other devices or nodes or apparatuses to form a network (not shown).

In one embodiment, the network (not shown) may be a wireless network, a wired network or a combination thereof. The network can be implemented as one of the different types of networks, such as GSM, CDMA, LTE, UMTS, intranet, local area network (LAN), wide area network (WAN), the internet, and the like. The network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network may include a variety of network devices, including routers, bridges, servers, computing devices, storage devices, and the like.

The system 400 as illustrated in accordance with an embodiment of the present subject matter may include a processor 402, an interface 404, and a memory 406. The processor 402 may be implemented as one or more microprocessors, microcomputers, microcontrollers, digital signal processors, central processing units, state machines, logic circuitries, and/or any devices that manipulate signals based on operational instructions. Among other capabilities, the at least one processor is configured to fetch and execute computer-readable instructions or modules stored in the memory.

The interface (I/O interface) 404 may include a variety of software and hardware interfaces, for example, a web interface, a graphical user interface, and the like. The I/O interface may allow the system 400 to interact with a user directly. Further, the I/O interface may enable the system 400 to communicate with other devices or nodes, computing devices, such as web servers and external data servers (not shown). The I/O interface can facilitate multiple communications within a wide variety of networks and protocol types, including wired networks, for example, GSM, CDMA, LAN, cable, etc., and wireless networks, such as WLAN, cellular, or satellite. The I/O interface may include one or more ports for connecting a number of devices to one another or to another server. The I/O interface may provide interaction between the user and the system 400 via, a screen provided for the interface.

The memory 406 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory may include plurality of instructions or modules or applications to perform various functionalities. The memory includes routines, programs, objects, components, data structures, etc., which perform particular tasks or implement particular abstract data types.

In one embodiment, a system 400 for cloud workload provisioning in a networked computing environment is disclosed. The system 400 includes a processor 402, and a memory 406 coupled to the processor 402 for executing a plurality of modules present in the memory. The plurality of modules includes a receiving module 408, an engine 412, a readjustment module 414, and a workload provisioning module 416. The receiving module 408 is configured to receive at least a cloud workload provision request. The engine 412 is configured to derive a workload provision scaling factor for the received cloud workload provision request using at least one workload profile of a historic data set. The readjustment module 414 is configured to readjust, automatically or manually, the workload provision scaling factor. The workload provisioning module 416 is configured to provision the cloud workload based on the readjusted workload provision scaling factor.

In one embodiment, the system 400 may include an identification module 410 that may be configured to identify at least one parameter associated with the cloud workload provision request. The parameter is preferably selected from an input capacity needed by the workload in terms of a number of users accessing the workload or an expected output capacity of the workload in terms of response to the access per second or any combination thereof.

In one embodiment, the system 400 may include an identification module 410 that may be configured to identify at least one parameter associated with the cloud workload provision request. The parameter is preferably selected from a resource or a load or a capacity or an affinity or a load distribution or a type of job or any combination thereof.

In one embodiment, the engine 412 may be further configured to match the parameter associated with the cloud workload provision request with at least one historical workload parameter pre-stored in the workload profile of a historic data set, and thereby derive, if a match is found, the workload provision scaling factor.

In one embodiment, the workload profile of the historic data set is created based on historical cloud workload provision requests.

In one embodiment, the engine 412 is further configured to collect at least a job detail associated with the historical cloud workload provision requests. Engine 412 is further configured to extract, using a log parser, a relevant information associated with the historical cloud workload provision requests. Engine 412 is further configured to categorize, using a workload classifier, the historical cloud workload provision requests. Engine 412 is further configured to calculate the workload provision scaling factor using a customizable equation. In one embodiment, it may be understood by the person skilled in the art that, the job details or the workload profile includes all the statistical information associated with the work: CPU usage average and maximum, Memory usage average and maximum, Other HW resources like Disk, Network, etc. average and maximum, Input details of the users logged in with peak time and average time, output details like TPS/RPS average and maximum, duration of the workload run, etc. Engine 412 uses these information to calculate the scaling factor as shown in the formula in the previous sections.

In one embodiment, the workload provision scaling factor provides at least a value associated with the resources for provisioning the cloud workload provision request. At this point the scaling factor may use only input load, output load and also CPU and memory details as described in the scaling factor formula. All the other workload or job details may also be used to enhance the scaling factor effectiveness in the future.

In one embodiment, a system 400 for cloud workload provisioning in a networked computing environment is disclosed. The system includes a processor 402, and a memory 406 coupled to the processor 402 for executing a plurality of modules present in the memory 406. The plurality of modules includes a receiving module 408, an identification module 410, an engine 412, and a workload provisioning module 416. The receiving module 408 is configured to receive at least a cloud workload provision request, in a computer data structure of the networked computing environment, for the cloud workload provisioning. The identification module 410 is configured to identify at least one parameter associated with the cloud workload provision request received. The engine 412 is configured to derive a workload provision scaling factor for the cloud workload provision request received based on the parameter identified and at least a pre-stored workload profile. The workload provisioning module 416 is configured to provision the cloud workload based on the scaling factor determined.

In one embodiment, the workload provision scaling factor indicates at least a resource value provisioned for the cloud workload provision request.

In one embodiment, the system 400 further includes a readjustment module 414 configured to readjust automatically or manually, the workload provision scaling factor derived. The readjustment module 414, upon readjusting manually, is configured to receive at least a resource value manually for the resource to be provisioned for the cloud workload provision request. The readjustment module 414, upon readjusting automatically, is configured to retrieve at least the pre-stored workload profile associated with the workload provision scaling factor derived; readjust automatically at least the resource selected for provisioning from the pre-stored workload profile; and readjust, the capacity order of the resources from the pre-stored workload profile.

In one embodiment, the system 400 further includes a notification module 418 configured to notify at least one user about the resources provisioned, about the cost involved in provisioning, or any combination thereof.

In one embodiment, the parameter is preferably selected from an input capacity needed by the workload in terms of a number of users accessing the workload or an expected output capacity of the workload in terms of response to the access per second or any combination thereof.

In one embodiment, the parameter is preferably selected from a resource or a load or a capacity or an affinity or a load distribution or a type of job or any combination thereof.

In one embodiment, the engine 412, to derive the workload provision scaling factor, may be further configured to match the parameter associated with the cloud workload provision request with at least one historical workload parameter pre-stored in the workload profile of a historic data set; and thereby derive, if a match is found, the workload provision scaling factor.

In one embodiment, the workload profile of the historic data set is created based on historical cloud workload provision requests.

In one embodiment, the engine 412 is further configured to collect at least a job detail associated with the historical cloud workload provision requests; to extract, using a log parser, a relevant information associated with the historical cloud workload provision requests; to categorize, using a workload classifier, the historical cloud workload provision requests; and to calculate the workload provision scaling factor using a customizable equation.

In one embodiment, the workload provision scaling factor provides at least a value associated with the resources for provisioning the cloud workload provision request.

In one embodiment, a system 400 for cloud workload provisioning for allocating workload among cloud based environment based upon historical data is disclosed. the system includes a database 420 containing a repository 420 of the historical data in a historical data table of historical workload profiles, and an engine 412 is configured to search the repository 420 of the historical data to select at least a historical workload profile based on a cloud workload profile provision request received. The engine 412 is configured to derive, by using the historical workload profile, a workload provision scaling factor for the cloud workload profile provision request received; to readjust, automatically or manually, the workload provision scaling factor for the cloud workload profile provision request; and thereby to provision the cloud workload based on the workload provision scaling factor.

Figure 5:
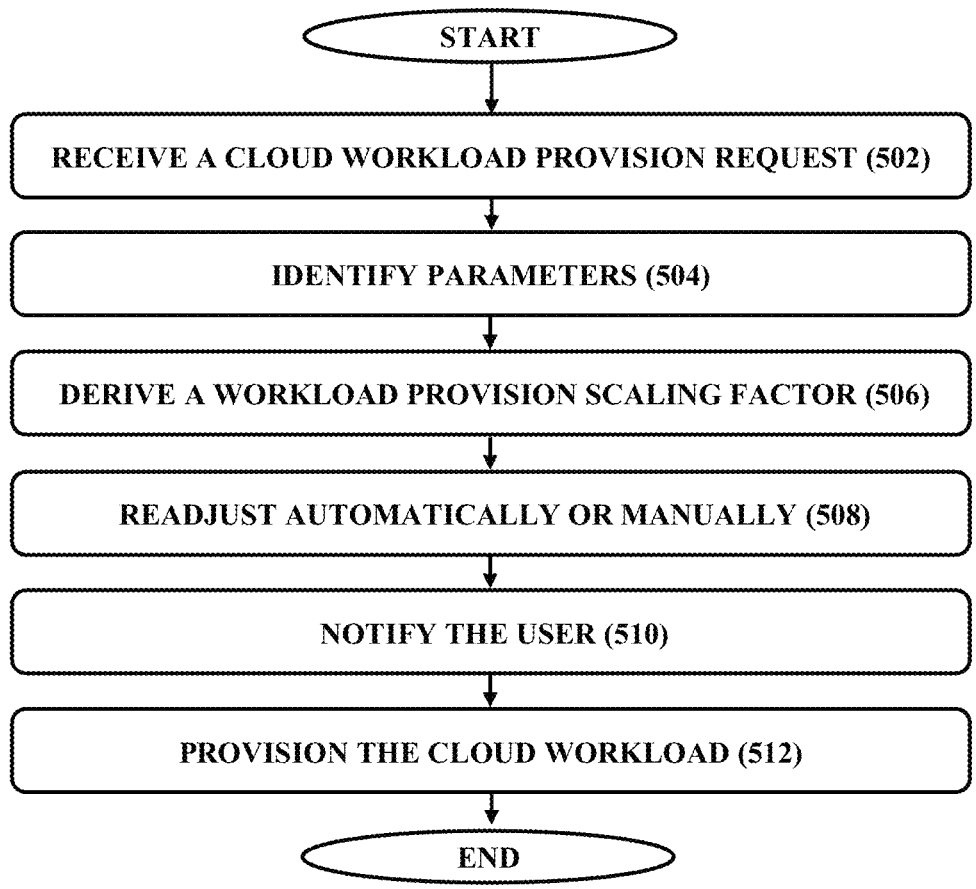
FIG. 5 illustrates a method for cloud workload provisioning, in accordance with an embodiment of the present subject matter.

FIG. 5 illustrates a method for cloud workload provisioning, in accordance with an embodiment of the present subject matter. The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

The order in which the method is described is not intended to be construed as a limitation, and any number of the described method blocks can be combined in any order to implement the method or alternate methods. Additionally, individual blocks may be deleted from the method without departing from the protection scope of the subject matter described herein. Furthermore, the method can be implemented in any suitable hardware, software, firmware, or combination thereof. However, for ease of explanation, in the embodiments described below, the method may be considered to be implemented in the above described system 400.

In one embodiment, a method for cloud workload provisioning is disclosed.

At block 502, at least a cloud workload provision request is received. The received request may include at least one parameter associated with the cloud workload provision request, the parameter is preferably selected from an input capacity needed by the workload in terms of a number of users accessing the workload or an expected output capacity of the workload in terms of response to the access per second or a resource or a load or a capacity or an affinity or a load distribution or a type of job or any combination thereof.

At block 506, a workload provision scaling factor is derived for the cloud workload provision request received. The workload provision scaling factor is derived using at least one workload profile of a historic data set. The workload provision scaling factor is derived by matching the parameter associated with the cloud workload provision request with at least one historical workload parameter pre-stored in the workload profile of a historic data set, and thereby deriving, if a match is found, the workload provision scaling factor. The workload profile of the historic data set is created based on historical cloud workload provision requests.

In one embodiment, the workload provision scaling factor is calculated by collecting at least a job detail associated with the historical cloud workload provision requests; extracting, using a log parser, a relevant information associated with the historical cloud workload provision requests; categorizing, using a workload classifier, the historical cloud workload provision requests; and calculating the workload provision scaling factor using a customizable equation. The workload provision scaling factor provides at least a value associated with the resources for provisioning the cloud workload provision request. In one embodiment, one or more formulas are generated to calculate the scaling factor to help readjust the cloud resources as needed for a workflow. If formulas are not used for the scaling factor, resource adjustment may still be achieved manually. Using the scaling factor to adjust resources however can be more systematic and automatic. Manual settings may be adjusted via the user interface.

At block 508, the workload provision scaling factor is readjusted. The scaling factor may be readjusted automatically or manually.

At block 512, the cloud workload is provisioned using the readjusted workload provision scaling factor.

In one embodiment, a method for cloud workload provisioning is disclosed.

At block 502, at least a cloud workload provision request is received for the cloud workload provisioning. The cloud workload provision request is received as a computer data structure of the networked computing environment.

At block 504, at least one parameter associated with the received cloud workload provision request is identified. The parameter is selected from an input capacity needed by the workload in terms of a number of users accessing the workload, an expected output capacity of the workload in terms of response to the access per second resource, a load, a capacity, an affinity, a load distribution, a type of job, or any combination thereof.

At block 506, a workload provision scaling factor is derived for the cloud workload provision request received based on the parameter identified and at least a pre-stored workload profile. The workload provision scaling factor indicates at least a resource value provisioned for the cloud workload provision request. The workload provision scaling factor is derived using pre-stored workload profile of a historic data set. The workload provision scaling factor is derived by matching the parameter associated with the cloud workload provision request with at least one historical workload parameter pre-stored in the workload profile of a historic data set, and thereby deriving, if a match is found, the workload provision scaling factor. The workload profile of the historic data set is created based on historical cloud workload provision requests.

In one embodiment, the workload provision scaling factor is calculated by collecting at least a job detail associated with the historical cloud workload provision requests; extracting, using a log parser, a relevant information associated with the historical cloud workload provision requests; categorizing, using a workload classifier, the historical cloud workload provision requests; and calculating the workload provision scaling factor using a customizable equation. The workload provision scaling factor provides at least a value associated with the resources for provisioning the cloud workload provision request.

At block 512, the cloud workload is provisioned using the readjusted workload provision scaling factor.

In one embodiment, upon deriving the workload provision scaling factor, at block 508, the workload provision scaling factor derived is readjusted. The scaling factor may be readjusted automatically or manually. The workload provision scaling factor derived is manually readjusted by receiving at least a resource value manually for the resource to be provisioned for the cloud workload provision request. The workload provision scaling factor derived is automatically readjusted by retrieving at least the pre-stored workload profile associated with the workload provision scaling factor derived; readjusting automatically at least the resource selected for provisioning from the pre-stored workload profile; and readjusting the capacity order of the resources from the pre-stored workload profile.

In one embodiment, upon readjusting the workload provision scaling factor, at block 510, the user is notified about the resources provisioned or the costs involved in provisioning.

In one embodiment, a method for cloud workload provisioning is disclosed. The method includes receiving at least a cloud workload profile provision request; comparing the received cloud workload profile provision request with a plurality of historical workload profiles; deriving, by using the historical workload profile, a workload provision scaling factor for the received cloud workload profile provision request; readjusting, automatically or manually, the workload provision scaling factor for the cloud workload profile provision request; and thereby provisioning the cloud workload based on the workload provision scaling factor. In one embodiment, based on the scaling factor, the resources are adjusted and created for the workload. However, if the resources are not available as needed by the scaling factor, then the resources may be readjusted to give the maximum possible based on available resources. For example, if the memory requirement is 16 GB but the system can only offer 14 GB, max, then that will be offered in this step.

Figure 6:
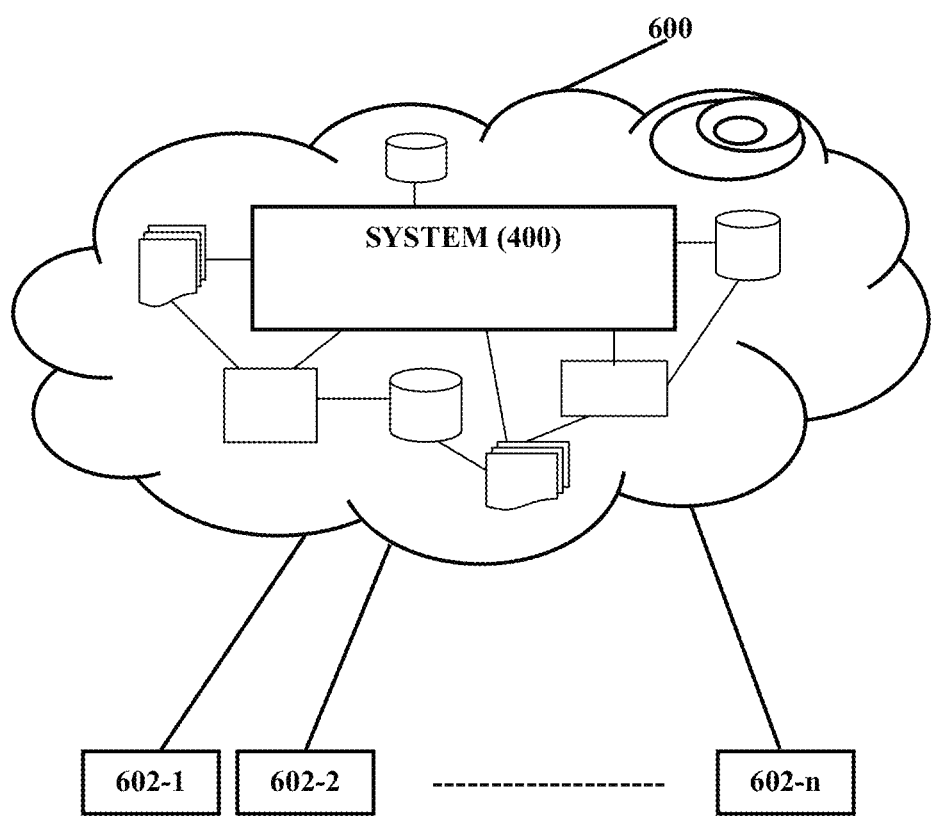
FIG. 6 illustrates system for cloud workload provisioning in a networked computing environment, in accordance with an embodiment of the present subject matter.

Referring to FIG. 6, a system 400 for cloud workload provisioning in a networked computing environment 600 is illustrated, in accordance with an embodiment of the present subject matter. As shown in FIG. 6, a schematic of an example of a cloud computing node is shown. Cloud computing node is only one example of a suitable cloud computing node and is not intended to suggest any limitation as to the scope of use or functionality of embodiments of the invention described herein. Regardless, cloud computing node is capable of being implemented and/or performing any of the functionality set forth hereinabove.

In cloud computing node, there may be a computer system/server/the system 400, which is operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 400 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 400 in cloud computing node is shown in the form of a general-purpose computing device. The components of computer system/server 400 may include, but are not limited to, one or more processors or processing units 402, a system memory 406, and a bus/interface 406 that couples various system components including system memory 406 to processor 402.

Bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 400 typically includes a variety of computer system readable media. Such media may be any available media that is accessible by computer system/server, and it includes both volatile and non-volatile media, removable and non-removable media.

System memory 406 can include computer system readable media in the form of volatile memory, such as random access memory (RAM) and/or cache memory. Computer system/server 400 may further include other removable/non-removable, volatile/non-volatile computer system storage media. By way of example only, storage system can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus by one or more data media interfaces. As will be further depicted and described below, memory may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility, having a set (at least one) of program modules, may be stored in memory by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

Computer system/server 400 may also communicate with one or more external devices such as a keyboard, a pointing device, a display, etc.; one or more devices that enable a consumer to interact with computer system/server; and/or any devices (e.g., network card, modem, etc.) that enable computer system/server to communicate with one or more other computing devices. Such communication can occur via I/O interfaces. Still yet, computer system/server can communicate with one or more networks such as a local area network (LAN), a general wide area network (WAN), and/or a public network (e.g., the Internet) via network adapter. It should be understood that although not shown, other hardware and/or software components could be used in conjunction with computer system/server. Examples include, but are not limited to: microcode, device drivers, redundant processing units, external disk drive arrays, RAID systems, tape drives, and data archival storage systems, etc.

As shown in FIG. 6, cloud computing environment 600 is depicted. As shown, cloud computing environment 600 includes one or more cloud computing nodes 400 with which local computing devices 602-1, 602-2 . . . 602-n (hereinafter, 602) used by cloud consumers, such as, for example, personal digital assistant (PDA) or cellular telephone, desktop computer, laptop computer, and/or automobile computer system may communicate. The nodes may communicate with one another. They may be grouped (not shown) physically or virtually, in one or more networks, such as private, community, public, or hybrid clouds as described hereinabove, or a combination thereof. This allows cloud computing environment 600 to offer infrastructure, platforms, and/or software as services for which a cloud consumer does not need to maintain resources on a local computing device. It is understood that the types of computing devices 602 shown in FIG. 6 are intended to be illustrative only and the computing nodes 400 and cloud computing environment can communicate with any type of computerized device over any type of network and/or network addressable connection (e.g., using a web browser).

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Apart from what is explained above, embodiments of the present invention also include the below mentioned advantages:

Embodiments of the present invention can provide convenience for users for cloud workload provision. Manual as well as automatic adjustment of workload profile makes deployment of workloads very comfortable for the user. A simple GUI provides the workload profile selection. Also the users will be notified by the resources selected as well as the associated charges/fees.

Embodiments of the present invention are compatible with existing cloud provisioning mechanisms and can provide a better resource scheduling with known characteristics of the workload profile. The scaling factor parameter based on resource selection can be fed to any scheduling mechanism to be provisioned.

As analysis of real time data is not required, but only the use of historic data to generate the 'scaling factor' parameter to provision the cloud workload is required, the overall process is very easy to understand and implement.

Embodiments of the present invention provide flexibility to create a scaling factor for batch jobs. As scaling factor of the workload can be generated in a batch job process when the system is less utilized, like at night times for a minimal system load impact.

Embodiments of the present invention enable reporting and better utilization of data center resource. Large scale historical data of workload profiles and the "scaling factor based optimal" scheduling information are stored in the history. This provides an immense value to the data center administrators for pattern recognition and analysis of the usage of the data for data centers to readjust their resource pools.

Embodiments of the present invention assist users to choose a cloud provision workload profile based on an automated guidance mechanism.

Embodiments of the present invention provision the cloud applications based on the resource needed using historical data set.

Embodiments of the present invention provide a scaling factor for each application which can be easily derived using the historical data of the previous similar workloads runs, hence, no special agent running in the system at all time is required and no performance or security impact is observed.

Embodiments of the present invention provide an automated guidance to the user for a workload to be provisioned. The system matches the user's workload profile based on a wide variety of historical data set which makes easy for users to choose the cloud provisioning for various kinds of workloads.

Embodiments of the present invention automatically readjust the workload profile for cloud provisioning if a user prefers to do so. Manual selection is also provided.

A person skilled in the art may understand that any known or new algorithms by be used for the implementation of the present invention. However, it is to be noted that, the present invention provides a method to be used during back up operation to achieve the above mentioned benefits and technical advancement irrespective of using any known or new algorithms.

A person of ordinary skill in the art may be aware that in combination with the examples described in the embodiments disclosed in this specification, units and algorithm steps may be implemented by electronic hardware, or a combination of computer software and electronic hardware. Whether the functions are performed by hardware or software depends on the particular applications and design constraint conditions of the technical solution. A person skilled in the art may use different methods to implement the described functions for each particular application, but it should not be considered that the implementation goes beyond the scope of the present invention.

It may be clearly understood by a person skilled in the art that for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiment of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Although implementations for system and method for cloud workload provisioning have been described in language specific to structural features and/or methods, it is to be understood that the appended claims are not necessarily limited to the specific features or methods described. Rather, the specific features and methods are disclosed as examples of implementations of the system and method for cloud workload provisioning.

We claim:

1. A method for cloud workload provisioning, the method comprising:
   receiving at least a cloud workload provision request containing at least one parameter;
   classifying the cloud workload provision request into one of a plurality of categories based on the at least one parameter;
   calculating, using at least one workload profile of a historic data set and the at least one parameter of the cloud workload provision request, a numerical workload provision scaling factor for the cloud workload provision request;
   readjusting the cloud workload provisioning based on the numerical workload provision scaling factor, wherein the numerical workload provision scaling factor is a single numerical value associated with at least two workload resources that are associated with the cloud workload provision request, wherein the numerical workload provision scaling factor is calculated by formula: ½ (LoadAvg %+CapacityAvg %)/(ResourceAvg %), wherein LoadAvg % is an input load averaged over an expected execution duration time of the cloud workload provision request, CapacityAvg % is an output load averaged over an expected execution duration time of the cloud workload provision request, and ResourceAvg % is an expected resource load averaged over an expected execution duration time of the cloud workload provision request; and
   provisioning the cloud workload provision request based on the numerical workload provision scaling factor,
   wherein the readjusting of the cloud workload provisioning comprises:
      readjusting a selection of workload resources using the numerical workload provision scaling factor or readjusting a capacity of at least one workload resource using the numerical workload provision scaling factor.

2. The method as claimed in claim 1, further comprises:
   identifying a first of the at least one parameter associated with the cloud workload provision request, the first of the at least one parameter comprises: an input capacity needed by a workload associated with the cloud workload provision request in terms of a number of users accessing the workload or an expected output capacity of the workload in terms of responses to user accesses per second.

3. The method as claimed in claim 1, further comprises:
   identifying a second of the at least one parameter associated with the cloud workload provision request, the second of the at least one parameter comprises: a resource, a load, a capacity, an affinity, a load distribution, or a type of job.

4. The method as claimed in claim 1, wherein calculating the numerical workload provision scaling factor, further comprises:
   matching the at least one parameter received in the cloud workload provision request with at least one historical workload parameter pre-stored in the at least one workload profile of the historic data set; and
   calculating, if a match is found, the numerical workload provision scaling factor.

5. The method as claimed in claim 1, wherein the capacity of the at least one workload resource is readjusted to provide a maximum capacity of the at least one workload resource if a capacity requirement of the at least one workload resource is not met.

6. A method for cloud workload provisioning, the method comprising:
   receiving at least a cloud workload provision request, in a computer data structure of a networked computing environment, for the cloud workload provisioning;
   classifying the cloud workload provision request into one of a plurality of categories based on at least one parameter;
   identifying the at least one parameter associated with the cloud workload provision request;
   calculating a numerical workload provision scaling factor for the cloud workload provision request based on the identified at least one parameter and at least one pre-stored workload profile, wherein the numerical workload provision scaling factor is a single numerical value associated with at least two workload resources that are associated with the cloud workload provision request, wherein the numerical workload provision scaling factor is calculated by formula: ½ (LoadAvg %+CapacityAvg %)/(ResourceAvg %),
   wherein LoadAvg % is an input load averaged over an expected execution duration time of the cloud workload provision request, CapacityAvg % is an output load averaged over an expected execution duration time of the cloud workload provision request, and ResourceAvg % is an expected resource load averaged over an expected execution duration time of the cloud workload provision request; and
   provisioning a cloud workload based on the numerical workload provision scaling factor, wherein the cloud workload provisioning is readjusted by:
      readjusting a selection of workload resources using the numerical workload provision scaling factor or readjusting a capacity of at least one workload resource using the numerical workload provision scaling factor.

7. The method as claimed in claim 6, wherein the numerical workload provision scaling factor indicates at least a resource value provisioned for the cloud workload provision request.

8. The method as claimed in claim 6, wherein the at least one pre-stored workload profile is created based on historical cloud workload provision requests.

9. The method as claimed in claim 6, wherein the numerical workload provision scaling factor is calculated for the cloud workload provision request by:
   collecting at least a job detail associated with historical cloud workload provision requests;
   extracting, using a log parser, at least a relevant information associated with the historical cloud workload provision requests;
   categorizing, using a workload classifier, the historical cloud workload provision requests; and
   calculating the numerical workload provision scaling factor using a customizable equation utilizing the relevant information extracted, the numerical workload provision scaling factor provides at least suggested values of resources for the cloud workload provisioning.

10. The method as claimed in claim 6, wherein the capacity of the at least one workload resource is readjusted to provide a maximum capacity of the at least one workload resource if a capacity requirement of the at least one workload resource is not met.

11. A system for cloud workload provisioning in a networked computing environment, the system comprising:
a processor;
a memory coupled to the processor for executing a plurality of modules present in the memory, the plurality of modules comprising:
a receiving module configured to receive at least a cloud workload provision request containing at least one parameter;
a workload classifier configured to classify the cloud workload provision request into one of a plurality of categories based on the at least one parameter;
an engine configured to calculate a numerical workload provision scaling factor for the cloud workload provision request received using at least one workload profile of a historic data set and the at least one parameter;
a readjustment module configured to readjust the cloud workload provisioning based on the numerical workload provision scaling factor, wherein the numerical workload provision scaling factor is a single numerical value associated with at least two workload resources that are associated with the cloud workload provision request, wherein the numerical workload provision scaling factor is calculated by formula: ½ (LoadAvg %+CapacityAvg %)/(ResourceAvg %), wherein LoadAvg % is an input load averaged over an expected execution duration time of the cloud workload provision request, CapacityAvg % is an output load averaged over an expected execution duration time of the cloud workload provision request, and ResourceAvg % is an expected resource load averaged over an expected execution duration time of the cloud workload provision request; and
a workload provisioning module configured to provision a cloud workload based on the numerical workload provision scaling factor,
wherein the readjusting of the cloud workload provisioning comprises:
readjusting a selection of workload resources using the numerical workload provision scaling factor or readjusting a capacity of at least one workload resource using the numerical workload provision scaling factor.

12. The system as claimed in claim 11, further comprises an identification module configured to identify a first of the at least one parameter associated with the cloud workload provision request, the first of the at least one parameter comprises: an input capacity needed by a workload associated with the cloud workload provision request in terms of a number of users accessing the cloud workload or an expected output capacity of the cloud workload in terms of responses to user accesses per second.

13. The system as claimed in claim 11, further comprises an identification module configured to identify a second of the at least one parameter associated with the cloud workload provision request, the second of the at least one parameter comprises:
a resource, a load, a capacity, an affinity, a load distribution, or a type of job.

14. The system as claimed in claim 11, wherein the engine, to calculate the numerical workload provision scaling factor, is further configured to:
match the at least one parameter received in the cloud workload provision request with at least one historical workload parameter pre-stored in the at least one workload profile of the historic data set; and
calculate, if a match is found, the numerical workload provision scaling factor.

15. The system as claimed in claim 11, wherein the capacity of the at least one workload resource is readjusted to provide a maximum capacity of the at least one workload resource if a capacity requirement of the at least one workload resource is not met.

* * * * *